No. 792,123. PATENTED JUNE 13, 1905.
C. ELLIS.
PROCESS OF MANUFACTURING GLASS.
APPLICATION FILED MAR. 28, 1905.
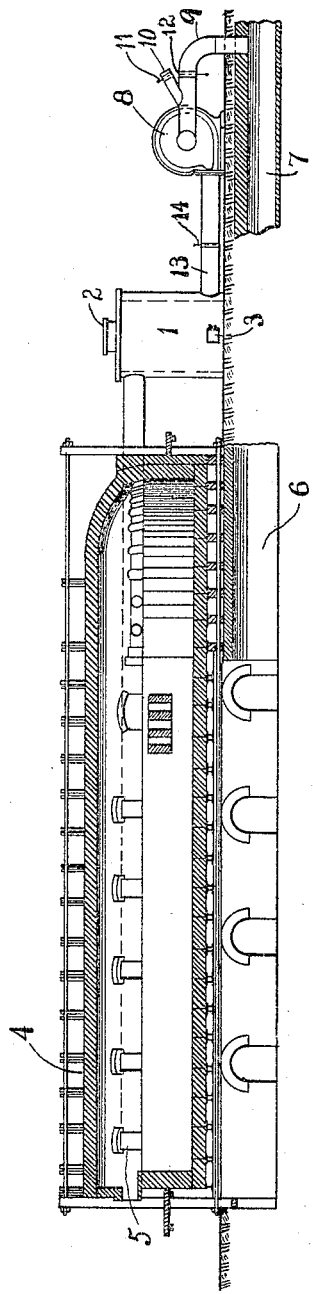
WITNESSES:
INVENTOR No. 792,123.

Patented June 13, 1905.

UNITED STATES PATENT OFFICE.

CARLETON ELLIS, OF NEW YORK, N. Y., ASSIGNOR TO ELDRED PROCESS COMPANY, OF NEW YORK, N. Y., A CORPORATION OF NEW YORK.

PROCESS OF MANUFACTURING GLASS.

SPECIFICATION forming part of Letters Patent No. 792,123, dated June 13, 1905.

Application filed March 28, 1905. Serial No. 252,488.

*To all whom it may concern:*

Be it known that I, CARLETON ELLIS, a citizen of the United States, and a resident of New York city, in the county of New York and State of New York, have invented certain new and useful Improvements in Processes for the Manufacture of Glass, of which the following is a specification.

This invention relates to process for the manufacture of glass in which the raw materials used contain carbon dioxid in combined form, which carbon dioxid is set free by the application of suitable heat and is conducted to a gas-producing appliance in order to therein aid in producing a combustible gas that by combustion in contact with the glass-forming materials will create the temperature requisite for the evolution of carbon dioxid and for fusion of the materials to a vitreous mass.

My invention relates particularly to the use of carbon dioxid as an endothermic cooling agent for the gas-producing mass of fuel which is used for supplying the heating agent required in the operation of glass-making.

Carbon dioxid when brought in contact with a mass of ignited coal or carbon is reduced to carbon monoxid, one volume of carbon dioxid producing two volumes of carbon monoxid. This reaction takes place at the expense of heat, or, in other words, it is an endothermic one, and in the reduction of one pound of carbon dioxid, or about 8.6 cubic feet of carbon dioxid at 62° Fahrenheit, there is a heat absorption when complete reduction occurs of approximately two thousand seven hundred B. T. U. In the majority of heating operations it is undesirable to have such an endothermic reaction taking place in the bed of fuel employed; but an exception is found in the gas-producer, which unless run at a very low temperature will give great trouble from clinkering and formation of slag. For that reason heretofore it has been necessary to employ steam as a cooling agent. This steam splits up, as is well known, in contact with incandescent carbon, forming water-gas. The temperature at which this reaction takes place with facility is above 2,000° Fahrenheit. Such a temperature is that of the clinkering-point of many fuels. For that reason the temperature of the producer will be run considerably lower than that at which the water-gas reaction efficiently occurs, and therefore much unchanged or partially-decomposed steam passes through the mass of fuel and is carried away in the producer-gas, to the great detriment of the quality of the latter. The passage of free steam through the fuel-bed gives rise to the formation of large quantities of carbon dioxid, which is also undesirable in the gas, owing, among other reasons, to its depressing action on the intensity of the flame.

It has been proposed to use products of combustion for the regulation and control of the temperature of the producer, but as most of these attempts have contemplated the use of the extremely hot gases from a furnace without any substantial cooling prior to their introduction into the producer these attempts have been unsuccessful, as control of the temperature and maintenance of a uniform temperature essential for economy in operation has not been secured. A gas-producer is an apparatus which must run day after day without stoppage. Any cause which tends to produce unevenness of operation or formation of clinker must be avoided. As soon as clinker is formed in a producer to any appreciable amount the blast used for gasification will not penetrate the fuel-bed properly, and a very poor quality of gas results. By the use of cooled gases greater uniformity of operation is secured. In the use of products of combustion coming from the ordinary furnace such as heretofore has been employed the amount of nitrogen contained therein is approximately seventy-nine per cent., for the combustion of oxygen to carbon dioxid involves no change in its volume, and in a hundred volumes of air the twenty-one volumes of oxygen therein contained on burning to carbon dioxid still remain twenty-one volumes. If products of combustion of this character, in which all the oxygen is completely burned, are passed through a mass of heated fuel, carbon dioxid will be reduced to carbon monoxid, and the gas produced will contain one part carbon monoxid to two parts nitrogen.

For many operations such a preponderance of the inert nitrogen is detrimental. This is especially true in the manufacture of glass where very high temperatures are required, particularly in the operation of fusing the raw materials.

My process contemplates, therefore, not the use of ordinary products of combustion carrying the large amount of nitrogen, as above described, but of gases rich in carbon dioxid obtained from the decomposition of the carbonate of soda or potash or other carbonates, such as are used in the manufacture of glass. In using carbon dioxid derived from this source only a small amount of nitrogen need be passed through the gas-producer. Because of this I find it possible to operate the gas-producer in a different manner from that ever heretofore accomplished, inasmuch as I have no longer to deal with the high specific heat or heat-absorptive capacity of an inert gas nor of its retarding influence on the reduction of carbon dioxid to carbon monoxid. I therefore am able to secure a gas more completely reduced to carbon monoxid than is possible where so large a quantity of the diluted gas is placed. This novel feature of my invention should be apparent from the following considerations. In the operation of the gas-producer it is impossible to completely reduce carbon dioxid introduced into or formed in the lower part of the producer into carbon monoxid by causing it to pass through the hot upper portion of the fuel-bed. Action ceases by dilution at a certain point, and the greater the amount of inert nitrogen present the more carbon dioxid will be carried away in the gas. As the quantity of carbon dioxid in the gas is in a measure an index of efficiency or of waste of the producer, it follows that any method which permits of substantially complete reduction of the carbon dioxid will effect great economies in fuel. This is what I accomplish by the process herein described. Suitable apparatus for carrying into effect this novel process is shown in the accompanying diagrammatic drawing, in which—

1 is a gas-producer adapted to contain a deep bed of fuel, having the hopper 2 for the introduction of the fuel and the ash-pit 3 for the removal of ashes.

4 is a furnace used for the manufacture of glass and is shown of the type known as the "tank-furnace," in which 5 represents ports for the admission of combustible gas and 6 an eduction-flue for its departure to the stack or the flue 7.

8 is a fan blower or exhauster drawing products of combustion from the flue 7 by means of the passage 9.

10 is an air-inlet having the regulating-damper 11.

A damper 12 is placed in the passage 9 to regulate the quantity of products of combustion. On the exhaust side of the fan is a passage 13, extending to the lower part of the producer 1. In this passage is shown the damper 14.

My method of operation is as follows: The products of combustion are taken from the blast-furnace, and particularly from that point at which carbon dioxid is being evolved in the greatest amount, and are drawn into the producer by means of fan-blower 8. By the passage through the fuel in the producer complete reduction to carbon monoxid is secured. By proportioning the amount of air and amount of carbon dioxid by means of adjustment of the dampers 11 and 12 an equilibrium of reaction between the endothermic and exothermic constituents is secured and the producer is run on the low-temperature plane conducive of economy and continuity of operation. The smaller amount of nitrogen in the gas prevents the formation of large amounts of carbon dioxid, and because of this fact the use of gases obtained in this manner from the decomposition of material entering into the manufacture of glass offers great advantages for the production of combustible gas.

I do not limit myself to the use of this process in any particular type of furnace or gas-producer; but it may be applied to any of the types of furnaces and producers now in common use without material departure from their present form of construction.

What I claim is—

Process for the manufacture of glass which consists in heating the raw materials used therefor to a high temperature by means of combustible gas, in withdrawing from the glass-forming mass the gaseous products of the reaction and in passing said products, in company with air or oxygen if necessary, through a deep bed of fuel to produce a combustible gas, which owing to the relatively low amount of nitrogen therein contained is of high calorific value and low in carbon dioxid.

Signed at New York city, in the county of New York and State of New York, this 27th day of March, A. D. 1905.

CARLETON ELLIS.

Witnesses:
WARREN E. DIXON,
A. M. SENIOR.